US008490282B2

(12) United States Patent
Guan et al.

(10) Patent No.: US 8,490,282 B2
(45) Date of Patent: Jul. 23, 2013

(54) METHOD OF MANUFACTURING A POROUS CATCHER

(75) Inventors: Shan Guan, Dublin, OH (US); Yonglin Xie, Pittsford, NY (US); Chang-Fang Hsu, Beavercreek, OH (US)

(73) Assignee: Eastman Kodak Company, Rochester, NY (US)

( * ) Notice: Subject to any disclaimer, the term of this patent is extended or adjusted under 35 U.S.C. 154(b) by 700 days.

(21) Appl. No.: 12/468,076

(22) Filed: May 19, 2009

(65) Prior Publication Data

US 2010/0293787 A1 Nov. 25, 2010

(51) Int. Cl.
*B21D 53/76* (2006.01)
*B23P 17/00* (2006.01)

(52) U.S. Cl.
USPC ................ 29/890.1; 29/830; 29/841; 347/40; 347/74; 347/90; 216/27

(58) Field of Classification Search
USPC ..................... 29/890.1, 830, 841; 347/40, 74, 347/90; 216/27
See application file for complete search history.

(56) References Cited

U.S. PATENT DOCUMENTS 3,373,437 A 3/1968 Sweet et al.
5,141,596 A * 8/1992 Hawkins et al. .................. 216/2
6,454,835 B1 9/2002 Baumer
6,457,807 B1 10/2002 Hawkins et al.
6,491,362 B1 12/2002 Jeanmaire
6,505,921 B2 1/2003 Chwalek et al.
6,513,918 B1 * 2/2003 Faisst et al. ..................... 347/73
6,554,410 B2 4/2003 Jeanmaire et al.
6,575,566 B1 6/2003 Jeanmaire et al.
6,588,888 B2 7/2003 Jeanmaire et al.
6,592,213 B2 7/2003 Long
6,793,328 B2 9/2004 Jeanmaire
6,827,429 B2 12/2004 Jeanmaire et al.
6,851,796 B2 2/2005 Jeanmaire et al.
2003/0081082 A1 * 5/2003 Jeanmaire et al. .............. 347/74
2006/0197810 A1 * 9/2006 Anagnostopoulos et al. .. 347/74
2008/0284818 A1 * 11/2008 Anagnostopoulos ........... 347/40
2008/0284835 A1 * 11/2008 Panchawagh et al. .......... 347/90

* cited by examiner

*Primary Examiner* — Peter DungBa Vo
*Assistant Examiner* — Jeffrey T Carley
(74) *Attorney, Agent, or Firm* — William R. Zimmerli

(57) ABSTRACT

According to one feature of the present invention, a method of manufacturing a porous catcher includes providing a catcher face material layer; forming pores in the catcher face material layer using a first etching process that is controlled by a first photolithographic mask; providing a reinforcing structure material layer that is in mechanical contact with the porous catcher face; forming openings in the reinforcing structure material layer using a second etching process that is controlled by a second photolithographic mask; and fluidically connecting the openings in the reinforcing structure and the pores of the catcher face using a material removal process.

20 Claims, 15 Drawing Sheets

METHOD OF MANUFACTURING A POROUS CATCHER

CROSS REFERENCE TO RELATED APPLICATIONS

Reference is made to commonly-assigned, U.S. Pat. No. 7,938,522, entitled "PRINTHEAD WITH POROUS CATCHER" and U.S. Patent Publication No. 2010/0295912, entitled "POROUS CATCHER", both filed concurrently herewith.

FIELD OF THE INVENTION

This invention relates generally to the field of digitally controlled printing systems, and in particular to continuous printing systems.

BACKGROUND OF THE INVENTION

Continuous inkjet printing uses a pressurized liquid source that produces a stream of drops some of which are selected to contact a print media (often referred to a "print drops") while other are selected to be collected and either recycled or discarded (often referred to as "non-print drops"). For example, when no print is desired, the drops are deflected into a capturing mechanism (commonly referred to as a catcher, interceptor, or gutter) and either recycled or discarded. When printing is desired, the drops are not deflected and allowed to strike a print media. Alternatively, deflected drops can be allowed to strike the print media, while non-deflected drops are collected in the capturing mechanism.

Drop placement accuracy of print drops is critical in order to maintain image quality. Liquid build up on the drop contact face of the catcher can adversely affect drop placement accuracy. As such, there is a continuing need to provide an improved catcher for these types of printing systems.

SUMMARY OF THE INVENTION

According to one feature of the present invention, a method of manufacturing a porous catcher includes providing a catcher face material layer; forming pores in the catcher face material layer using a first etching process that is controlled by a first photolithographic mask; providing a reinforcing structure material layer that is in mechanical contact with the porous catcher face; forming openings in the reinforcing structure material layer using a second etching process that is controlled by a second photolithographic mask; and fluidically connecting the openings in the reinforcing structure and the pores of the catcher face using a material removal process.

BRIEF DESCRIPTION OF THE DRAWINGS

In the detailed description of the example embodiments of the invention presented below, reference is made to the accompanying drawings, in which.

DETAILED DESCRIPTION OF THE INVENTION

Figure 1:
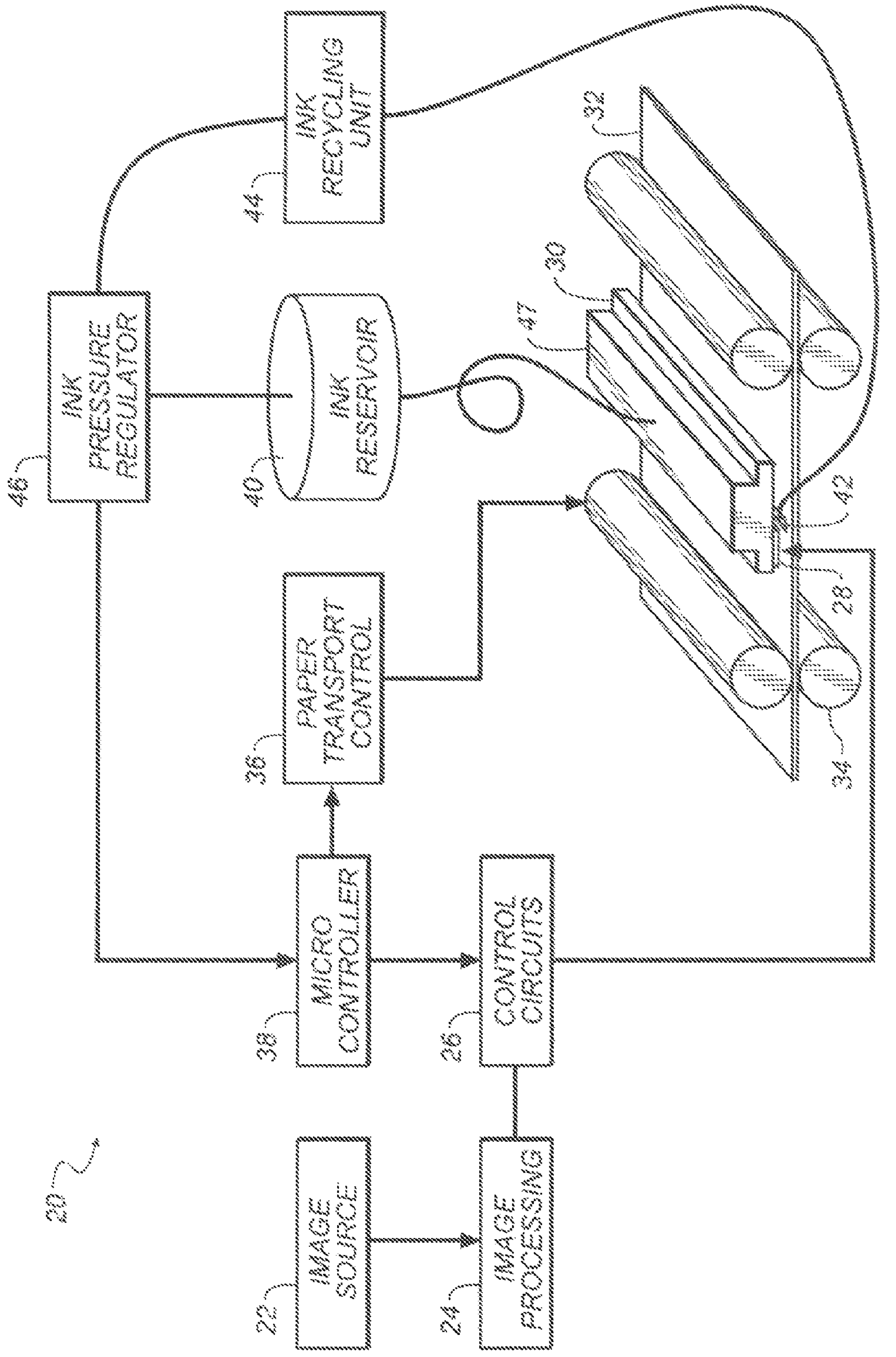
FIG. 1 is a schematic diagram of an example embodiment of a printer system made in accordance with the present invention.

The present description will be directed in particular to elements forming part of, or cooperating more directly with, apparatus in accordance with the present invention. It is to be understood that elements not specifically shown or described may take various forms well known to those skilled in the art. In the following description and drawings, identical reference numerals have been used, where possible, to designate identical elements.

The example embodiments of the present invention are illustrated schematically and not to scale for the sake of clarity. One of the ordinary skills in the art will be able to readily determine the specific size and interconnections of the elements of the example embodiments of the present invention.

As described herein, the example embodiments of the present invention provide a printhead and printhead components typically used in inkjet printing systems. However, many other applications are emerging which use inkjet printheads to emit liquids (other than inks) that need to be finely metered and deposited with high spatial precision. As such, as described herein, the terms "liquid" and "ink" refer to any material that can be ejected by the printhead or printhead components described below.

Referring to FIG. 1, a continuous ink jet printer system 20 includes an image source 22 such as a scanner or computer which provides raster image data, outline image data in the form of a page description language, or other forms of digital image data. This image data is converted to half-toned bitmap image data by an image processing unit 24 which also stores the image data in memory. A plurality of drop forming mechanism control circuits 26 read data from the image memory and apply time-varying electrical pulses to a drop forming device(s) 28 that are associated with one or more nozzles of a printhead 30. These pulses are applied at an appropriate time, and to the appropriate nozzle, so that drops formed from a continuous ink jet stream will form spots on a recording medium 32 in the appropriate position designated by the data in the image memory.

Recording medium 32 is moved relative to printhead 30 by a recording medium transport system 34, which is electronically controlled by a recording medium transport control system 36, and which in turn is controlled by a micro-controller 38. The recording medium transport system shown in FIG. 1 is a schematic only, and many different mechanical configurations are possible. For example, a transfer roller could be used as recording medium transport system 34 to facilitate transfer of the ink drops to recording medium 32. Such transfer roller technology is well known in the art. In the case of page width printheads, it is most convenient to move recording medium 32 past a stationary printhead. However, in the case of scanning print systems, it is usually most convenient to move the printhead along one axis (the sub-scanning direction) and the recording medium along an orthogonal axis (the main scanning direction) in a relative raster motion.

Ink is contained in an ink reservoir 40 under pressure. In the non-printing state, continuous ink jet drop streams are unable to reach recording medium 32 due to an ink catcher 42 that blocks the stream and which may allow a portion of the ink to be recycled by an ink recycling unit 44. The ink recycling unit reconditions the ink and feeds it back to reservoir 40. Such ink recycling units are well known in the art. The ink pressure suitable for optimal operation will depend on a number of factors, including geometry and thermal properties of the nozzles and thermal properties of the ink. A constant ink pressure can be achieved by applying pressure to ink reservoir 40 under the control of ink pressure regulator 46. Alternatively, the ink reservoir can be left unpressurized, or even under a reduced pressure (vacuum), and a pump is employed to deliver ink from the ink reservoir under pressure to the printhead 30. In such an embodiment, the ink pressure regulator 46 can comprise an ink pump control system. As shown in FIG. 1, catcher 42 is a type of catcher commonly referred to as a "knife edge" catcher.

The ink is distributed to printhead 30 through an ink channel 47. The ink preferably flows through slots or holes etched through a silicon substrate of printhead 30 to its front surface, where a plurality of nozzles and drop forming mechanisms, for example, heaters, are situated. When printhead 30 is fabricated from silicon, drop forming mechanism control circuits 26 can be integrated with the printhead. Printhead 30 also includes a deflection mechanism (not shown in FIG. 1) which is described in more detail below with reference to FIGS. 2 and 3.

Figure 2:
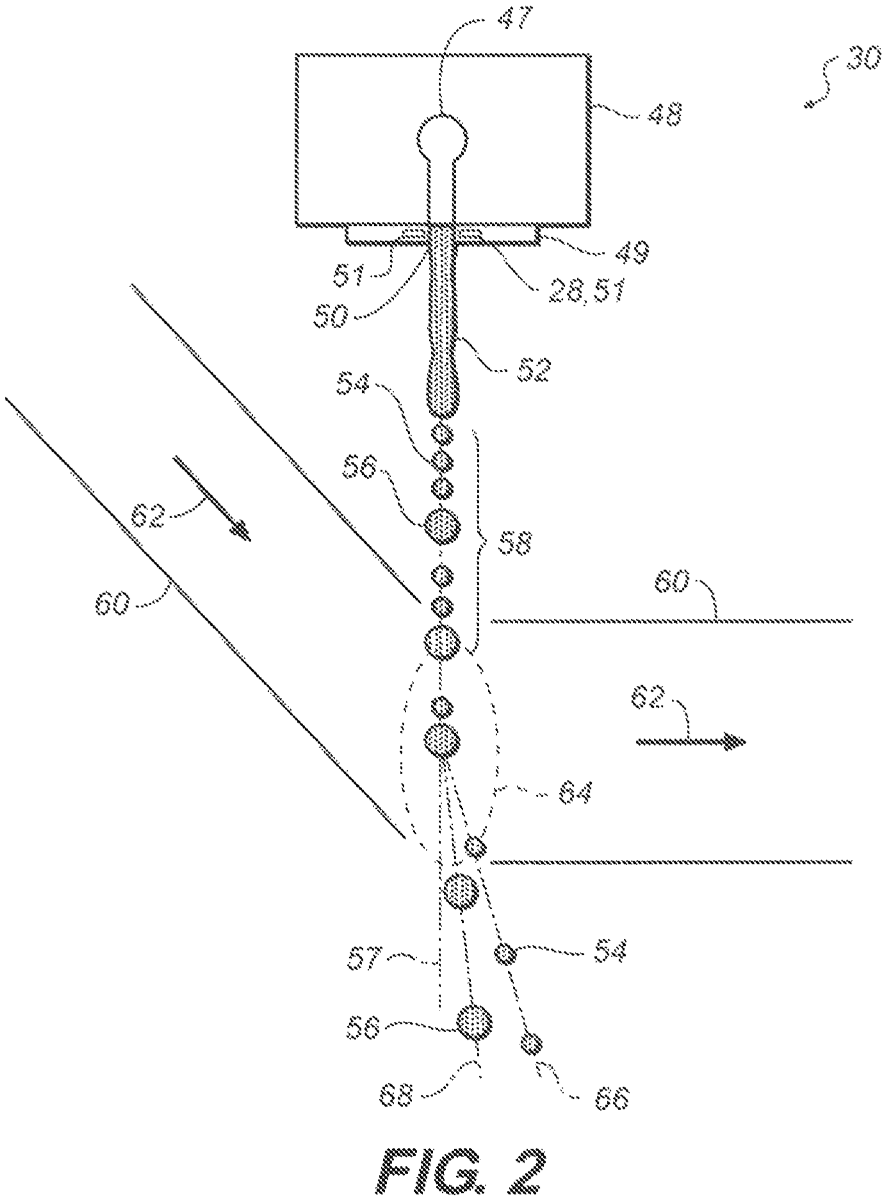
FIG. 2 is a schematic view of an example embodiment of a continuous printhead made in accordance with the present invention.
Figure 3:
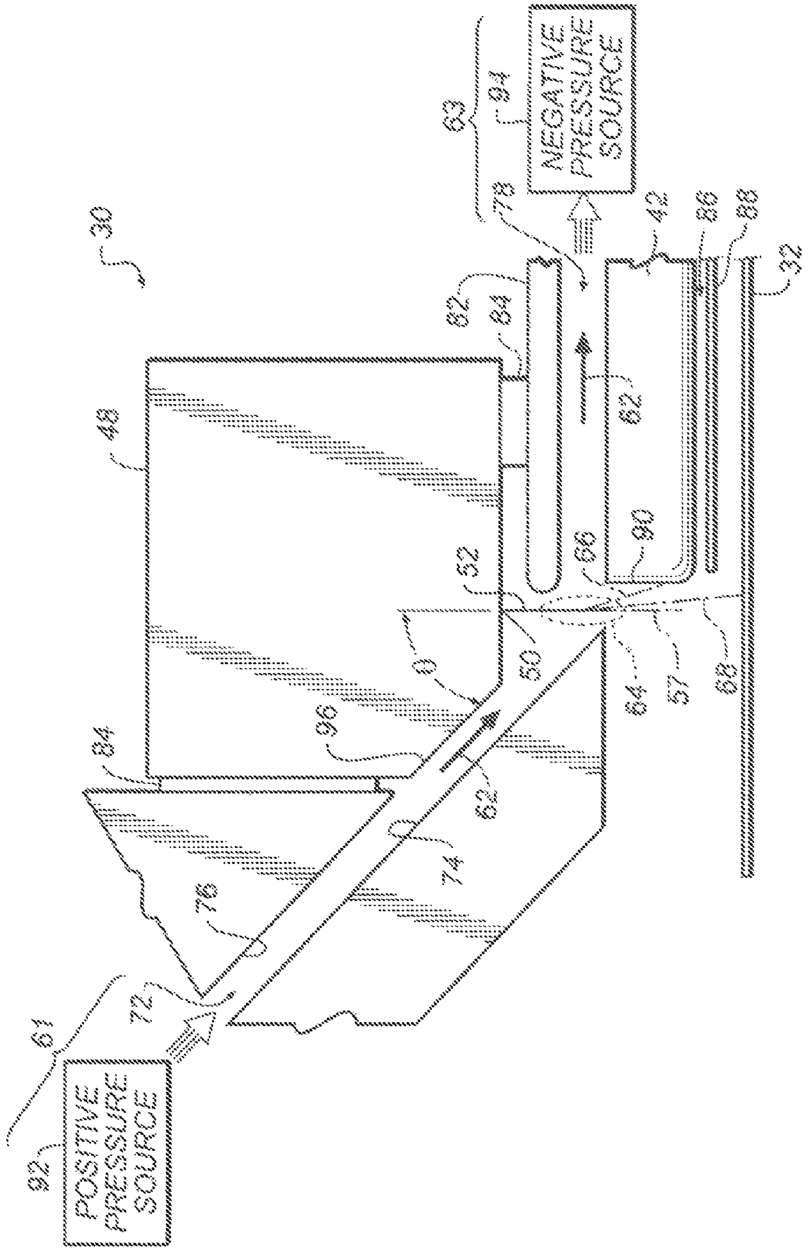
FIG. 3 is a schematic view of an example embodiment of a continuous printhead made in accordance with the present invention.

Referring to FIG. 2, a schematic view of continuous liquid printhead 30 is shown. A jetting module 48 of printhead 30 includes an array or a plurality of nozzles 50 formed in a nozzle plate 49. In FIG. 2, nozzle plate 49 is affixed to jetting module 48. However, as shown in FIG. 3, nozzle plate 49 can be integrally formed with jetting module 48.

Liquid, for example, ink, is emitted under pressure through each nozzle 50 of the array to form filaments of liquid 52. In FIG. 2, the array or plurality of nozzles extends into and out of the figure.

Jetting module 48 is operable to form liquid drops having a first size and liquid drops having a second size through each nozzle. To accomplish this, jetting module 48 includes a drop stimulation or drop forming device 28, for example, a heater or a piezoelectric actuator, that, when selectively activated, perturbs each filament of liquid 52, for example, ink, to induce portions of each filament to breakoff from the filament and coalesce to form drops 54, 56.

In FIG. 2, drop forming device 28 is a heater 51 located in a nozzle plate 49 on one or both sides of nozzle 50. This type of drop formation is known and has been described in, for example, U.S. Pat. No. 6,457,807 B1, issued to Hawkins et al., on Oct. 1, 2002; U.S. Pat. No. 6,491,362 B1, issued to Jeanmaire, on Dec. 10, 2002; U.S. Pat. No. 6,505,921 B2, issued to Chwalek et al., on Jan. 14, 2003; U.S. Pat. No. 6,554,410 B2, issued to Jeanmaire et al., on Apr. 29, 2003; U.S. Pat. No. 6,575,566 B1, issued to Jeanmaire et al., on Jun. 10, 2003; U.S. Pat. No. 6,588,888 B2, issued to Jeanmaire et al., on Jul. 8, 2003; U.S. Pat. No. 6,793,328 B2, issued to Jeanmaire, on Sep. 21, 2004; U.S. Pat. No. 6,827,429 B2, issued to Jeanmaire et al., on Dec. 7, 2004; and U.S. Pat. No. 6,851,796 B2, issued to Jeanmaire et al., on Feb. 8, 2005.

Typically, one drop forming device 28 is associated with each nozzle 50 of the nozzle array. However, a drop forming device 28 can be associated with groups of nozzles 50 or all of nozzles 50 of the nozzle array.

When printhead 30 is in operation, drops 54, 56 are typically created in a plurality of sizes, for example, in the form of large drops 56, a first size, and small drops 54, a second size. The ratio of the mass of the large drops 56 to the mass of the small drops 54 is typically approximately an integer between 2 and 10. A drop stream 58 including drops 54, 56 follows a drop path or trajectory 57.

Printhead 30 also includes a gas flow deflection mechanism 60 that directs a flow of gas 62, for example, air, past a portion of the drop trajectory 57. This portion of the drop trajectory is called the deflection zone 64. As the flow of gas 62 interacts with drops 54, 56 in deflection zone 64 it alters the drop trajectories. As the drop trajectories pass out of the deflection zone 64 they are traveling at an angle, called a deflection angle, relative to the undeflected drop trajectory 57.

Small drops 54 are more affected by the flow of gas than are large drops 56 so that the small drop trajectory 66 diverges from the large drop trajectory 68. That is, the deflection angle for small drops 54 is larger than for large drops 56. The flow of gas 62 provides sufficient drop deflection and therefore sufficient divergence of the small and large drop trajectories so that catcher 42 (shown in FIGS. 1 and 3) can be positioned to intercept one of the small drop trajectory 66 and the large drop trajectory 68 so that drops following the trajectory are collected by catcher 42 while drops following the other trajectory bypass the catcher and impinge a recording medium 32 (shown in FIGS. 1 and 3).

When catcher 42 is positioned to intercept large drop trajectory 68, small drops 54 are deflected sufficiently to avoid contact with catcher 42 and strike the print media. As the small drops are printed, this is called small drop print mode. When catcher 42 is positioned to intercept small drop trajectory 66, large drops 56 are the drops that print. This is referred to as large drop print mode.

Referring to FIG. 3, jetting module 48 includes an array or a plurality of nozzles 50. Liquid, for example, ink, supplied through channel 47, is emitted under pressure through each nozzle 50 of the array to form filaments of liquid 52. In FIG. 3, the array or plurality of nozzles 50 extends into and out of the figure.

Drop stimulation or drop forming device 28 (shown in FIGS. 1 and 2) associated with jetting module 48 is selectively actuated to perturb the filament of liquid 52 to induce portions of the filament to break off from the filament to form drops. In this way, drops are selectively created in the form of large drops and small drops that travel toward a recording medium 32.

Positive pressure gas flow structure 61 of gas flow deflection mechanism 60 is located on a first side of drop trajectory 57. Positive pressure gas flow structure 61 includes first gas flow duct 72 that includes a lower wall 74 and an upper wall 76. Gas flow duct 72 directs gas supplied from a positive pressure source 92 at downward angle θ of approximately a 45° toward drop deflection zone 64. An optional seal(s) 84 provides an air seal between jetting module 48 and upper wall 76 of gas flow duct 72.

Upper wall 76 of gas flow duct 72 does not need to extend to drop deflection zone 64 (as shown in FIG. 2). In FIG. 3, upper wall 76 ends at a wall 96 of jetting module 48. Wall 96 of jetting module 48 serves as a portion of upper wall 76 ending at drop deflection zone 64.

Negative pressure gas flow structure 63 of gas flow deflection mechanism 60 is located on a second side of drop trajectory 57. Negative pressure gas flow structure includes a second gas flow duct 78 located between catcher 42 and an upper wall 82 that exhausts gas flow from deflection zone 64. Second duct 78 is connected to a negative pressure source 94 that is used to help remove gas flowing through second duct 78. An optional seal(s) 84 provides an air seal between jetting module 48 and upper wall 82.

As shown in FIG. 3, gas flow deflection mechanism 60 includes positive pressure source 92 and negative pressure source 94. However, depending on the specific application contemplated, gas flow deflection mechanism 60 can include only one of positive pressure source 92 and negative pressure source 94. Furthermore, the deflection mechanism is not limited to a gas flow deflection mechanism. For example, electrostatic or thermal deflection mechanisms can be used.

Gas supplied by first gas flow duct 72 is directed into the drop deflection zone 64, where it causes large drops 56 to follow large drop trajectory 68 and small drops 54 to follow small drop trajectory 66. As shown in FIG. 3, small drop trajectory 66 is intercepted by a front face 90 of catcher 42. Small drops 54 contact face 90 and flow down face 90 and into a liquid return duct 86 located or formed between catcher 42 and a plate 88. Collected liquid is either recycled and returned to ink reservoir 40 (shown in FIG. 1) for reuse or discarded. Large drops 56 bypass catcher 42 and travel on to recording medium 32. Alternatively, catcher 42 can be positioned to intercept large drop trajectory 68. Large drops 56 contact catcher 42 and flow into a liquid return duct located or formed in catcher 42. Collected liquid is either recycled for reuse or discarded. In some embodiments, a negative pressure source is attached to liquid return duct 86 to aid in the removal of ink from the duct. As shown in FIG. 3, catcher 42 is a type of catcher commonly referred to as a "Coanda" catcher.

Figure 4:
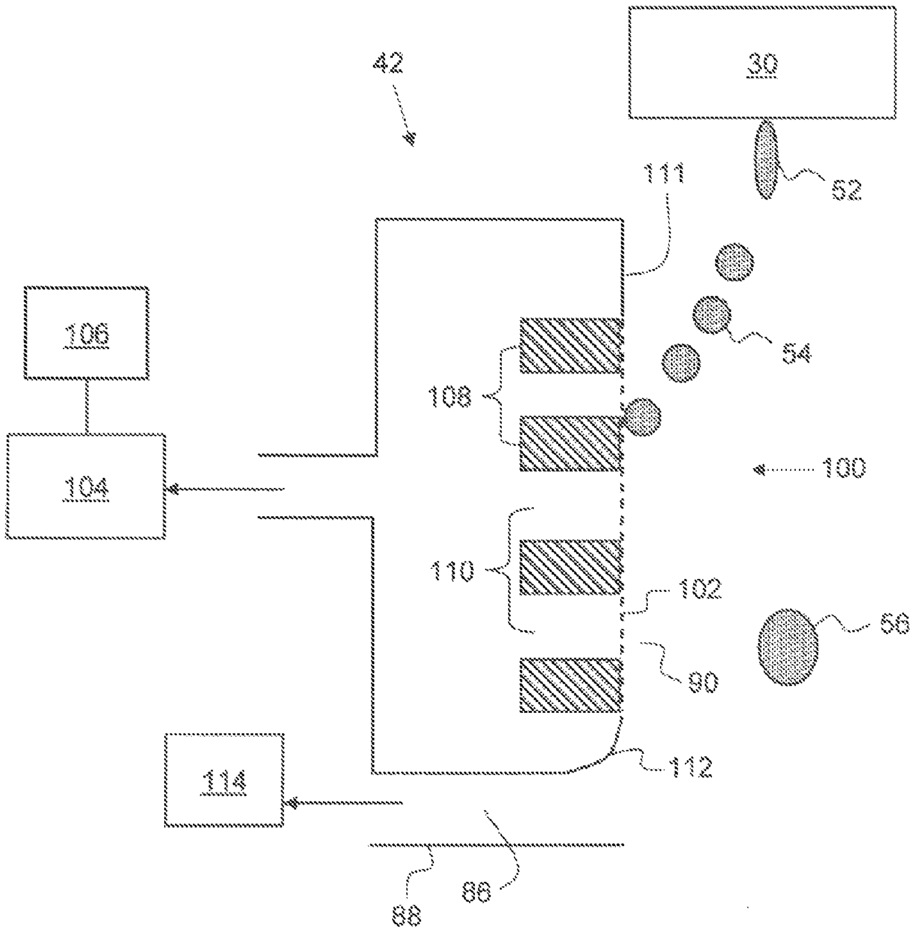
FIG. 4 is a schematic side view of an example embodiment of a liquid drop contact structure according to the present invention.

Referring to FIG. 4, an example embodiment of a catcher 42 having a front face 90 including a liquid drop contact structure 100 upon which the non-print drops 54 impinge is shown. The liquid drop contact structure 100 includes a plurality of pores 102 distinct from the liquid return duct 86, each of the pores 102 having a substantially uniform size when compared to each other.

Figure 15A:
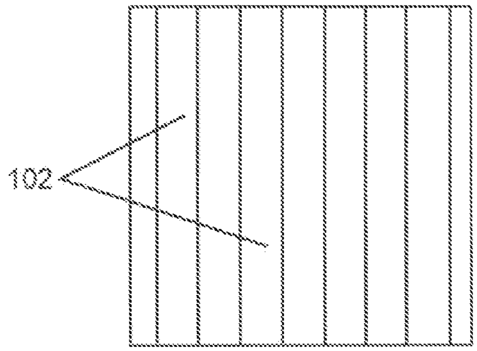
FIGS. 15(A)-15(F) are schematic views of example arrangements of the pores of the liquid drop contact structure.
Figure 15B:
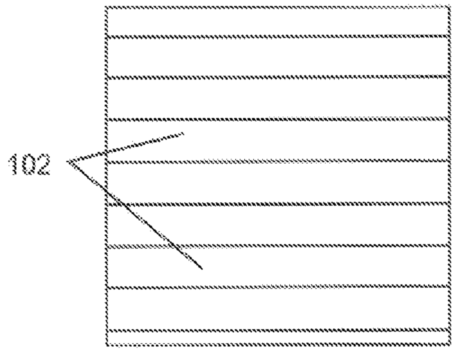
Figure 15C:
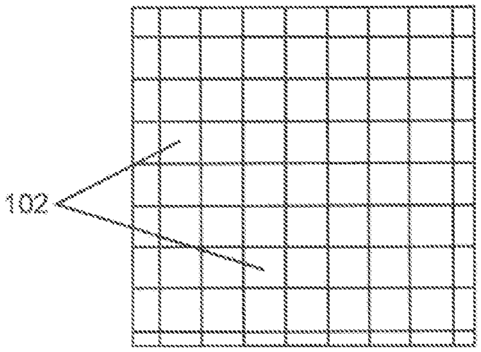
Figure 15D:
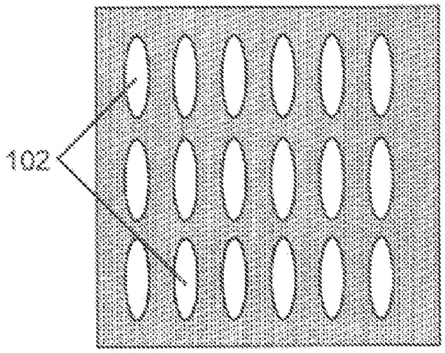

Some example two dimensional arrangements of the pores 102 are shown in FIGS. 15(A)-(F), although the pores can be arranged in many other designs, depending on the specific application contemplated. The pores can be arranged with an equal density across the face of the catcher (as shown in FIGS. 15(A)-(F)) or can have a varying density across the width, or height of the catcher face. Furthermore, the shape of the pores is not limited to being circular. The pores can be square (as shown in FIG. 15(C)), rectangular (as shown in FIGS. 15(A) and (B)), elliptical (as shown in FIG. 15(D)), or any other shape suitable for the specific application contemplated.

Referring back to FIG. 4, the plurality of pores 102 has a critical pressure point above which air can displace liquid from the plurality of pores. Below this critical pressure point, air can not displace liquid from the pores, as a result air cannot be passed through the pores, but the liquid can flow freely through the pores. The critical pressure point is a function of the surface tension of the liquid, the wetting or contact angle of the liquid with the liquid drop contact structure 100, and the size of the pores 102. The flow of fluid through the pores 102 is limited by the viscous drag on the fluid as it flows through the pores 102. By maintaining a vacuum level inside liquid drop contact structure that is such that the pressure drop across the pores is less than the critical pressure, ink can be pulled through the pores without ingesting any air through the pores. By eliminating the ingestion of air in this manner, problems such as the creation of foam in the ink return line can be reduced or even eliminated.

Both the critical pressure at which air can displace liquid from the pores and the flow rate of liquid through the pores depend on the pore size with the critical pressure dropping with increased pore size and the rate at which liquid can flow through the pores. Therefore it is desirable to have large pores to allow for rapid fluid removal and desirable to have pores small or at least less than some limiting size to prevent the ingestion of air. As a result of these competing requirements, it is desirable for the pores to have a substantially uniform size less than the size at which air can be ingested for the vacuum levels employed. As mentioned above, the critical pressure point depends on the wetting angle of the liquid with the liquid drop contract structure, or at least on the wetting angle to the wall of the pores with more wettable surfaces yielding higher critical pressures. It is therefore desirable for the walls of the pores to be made of a highly wettable material. For water based liquids, for example, this means that the portion of the liquid drop contact structure including the plurality of pores is made from a hydrophilic material. With an appropriate liquid drop contact structure 100, having proper pore size, surface area of the structure, and liquid wetting characteristics, any desired flow rate of liquid through the liquid drop contact structure 100 can be obtained before the pressure drop across the liquid drop contact structure 100 exceeds the critical pressure point.

In order to maintain the appropriate pressure drop, a negative pressure source 104 is in fluid communication with the plurality of pores 102 of the liquid contact structure 100. The negative pressure source 104 includes a pressure regulator 106 which serves to control the negative pressure such that the negative pressure remains below the critical pressure point of the plurality of pores 102 of the liquid drop contact structure 100. The use of a single negative pressure source 104 with a differential pressure regulator allows the vacuum level to be varied over time within a pressure range below the critical pressure point as needed to accommodate changes or different operating conditions (for example, times when greater amounts of liquid are contacting the catcher face and times when lesser amounts of liquid is contacting the catcher face) while still maintaining the desired pressure drop across the liquid drop contact structure 100. Alternatively, the negative pressure provided by the negative pressure source can be maintained at a substantially constant pressure level below the critical pressure point of the plurality of pores of the liquid drop contact structure throughout printhead operation.

During printhead operation, the non-printing drops 54 strike the liquid drop contact structure 100 and are pulled into the structure through the pores 102. The face 90 including the pores 102 should be thin to minimize the flow impedance across the face, as a large flow impedance limits the removal rate of the liquid from the liquid drop contact structure 100 and can ultimately affect print quality. The catcher face 90 is preferably constructed from dielectric materials such as silicon oxide, silicon nitride, or silicon carbide, metals such as tantalum, polymeric materials, or silicon, although other materials can be used depending on the specific application contemplated.

In order to support the thin porous drop contact face 90 and provide rigidity, a reinforcing structure 108 is in mechanical contact with the liquid drop contact structure 100, as shown in FIG. 4. As used herein, the term "mechanical contact" means that the structures are mechanically coupled together, but are not necessarily in direct contact. The reinforcing structure should be made of a flexible material, which provides the enhanced mechanical strength without adding too much flow resistance. Examples of suitable flexible materials are metals such as tantalum, polymers such as polyimide or SU-8 (commercially available from Microchem Corp., Newton, Mass.) or dielectric materials, although other materials can be suitable, depending on the specific application. This reinforcing structure 108 includes a plurality of fluid channels 110 which are in fluid communication with the recycling unit or a waste tank, depending on the application contemplated, through a fluid return line. The fluid channels 110 of the reinforcing structure 108 include openings that are larger than the size of the pores 102 in the liquid drop contact structure 100. The large size of openings results in a lower fluid impedance when compared to the fluid impedance of the plurality of pores 102 of the liquid drop contact structure 100, allowing the fluid to flow more quickly and easily through the fluid channels 110. In FIG. 4, the reinforcing structure 108 is located on an internal side (inside) of the liquid drop contact structure 100.

As typically the non-print drops 54 don't impinge on the front face 90 of the catcher 42 all the way at the top of this face, in some embodiments the catcher face above the drop impact region can include a non-porous section 111. In some embodiments, all the liquid from the drops striking the front face 90 of the catcher is removed from the catcher face via the pores 102. In other embodiments, such as is shown in FIG. 4, only a portion of the liquid from the drops striking the front face of the catcher is extracted through the pores 102. In such embodiments, the radius of edge 112 enables fluid flowing down the face to flow around the edge and enter the liquid return duct 86. Liquid entering the liquid return duct is extracted from there and returned to the ink reservoir by means of additional vacuum source 114.

Figure 5:
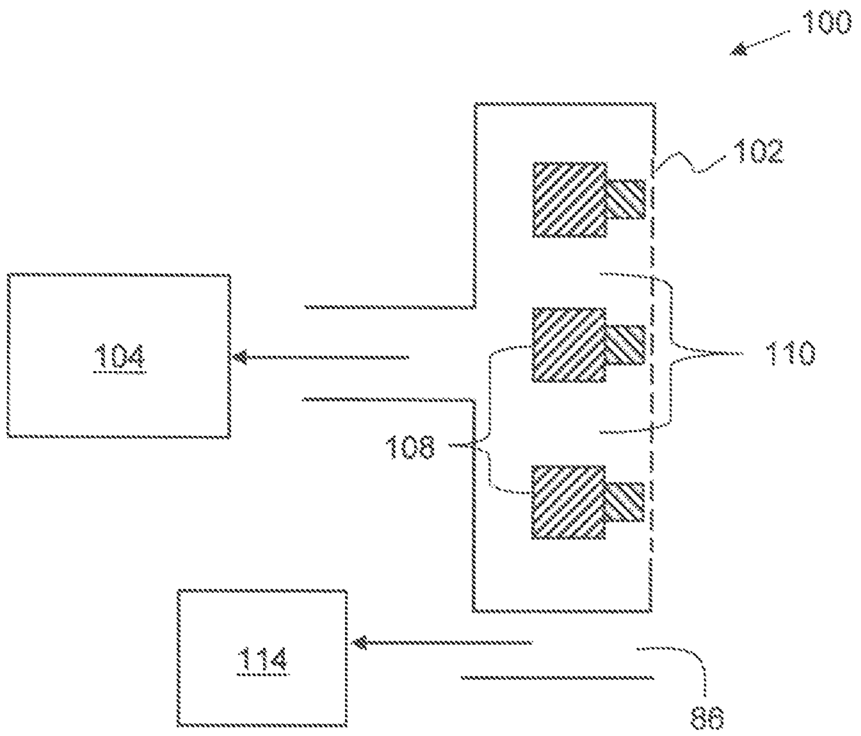
FIG. 5 is a schematic side view of an example embodiment of a liquid drop contact structure according to the present invention including a reinforcing structure having fluid channels with varying cross-sections.

Reinforcing structure 108 can be one continuous layer, as shown in FIG. 4, but, as shown in FIG. 5, it need not be uniform and can be composed of multiple layers with varying thicknesses (often referred to a being stepped or tiered). In other words, the fluid channels 110 of the reinforcing structure 108 can have varying cross-sections over the length of the fluid channel. The embodiment in FIG. 5 can be manufactured using a multi-layer etch, for example. The use of a multi-layer etch process also allows for the creation of cross-flow channels in the reinforcing structure, depending on the specific application contemplated.

Figure 6:
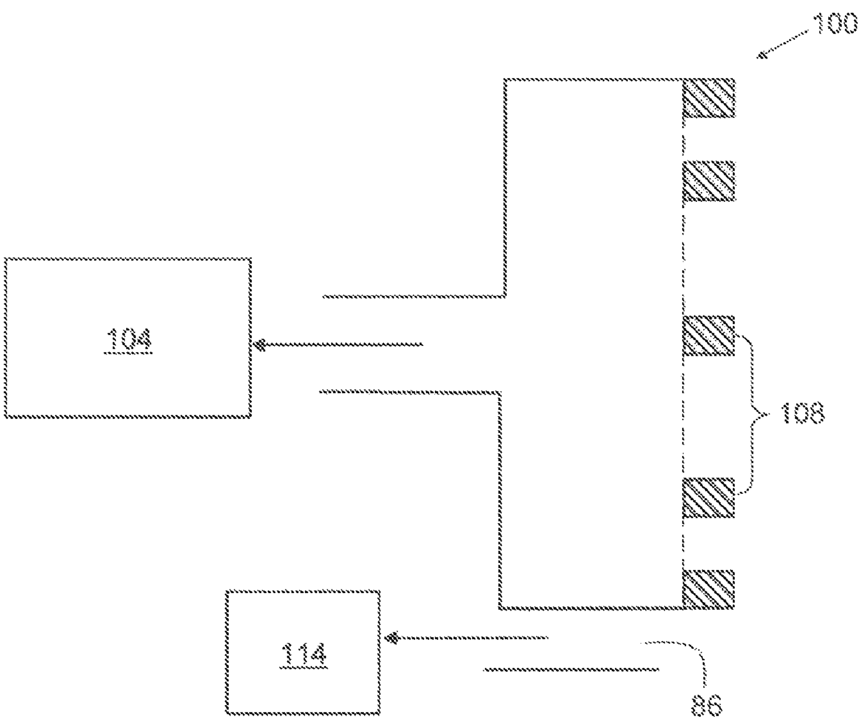
FIG. 6 is a schematic top view of an example embodiment of a liquid drop contact structure according to the present invention including a reinforcing structure located outside of the liquid drop contact structure.
Figure 7:
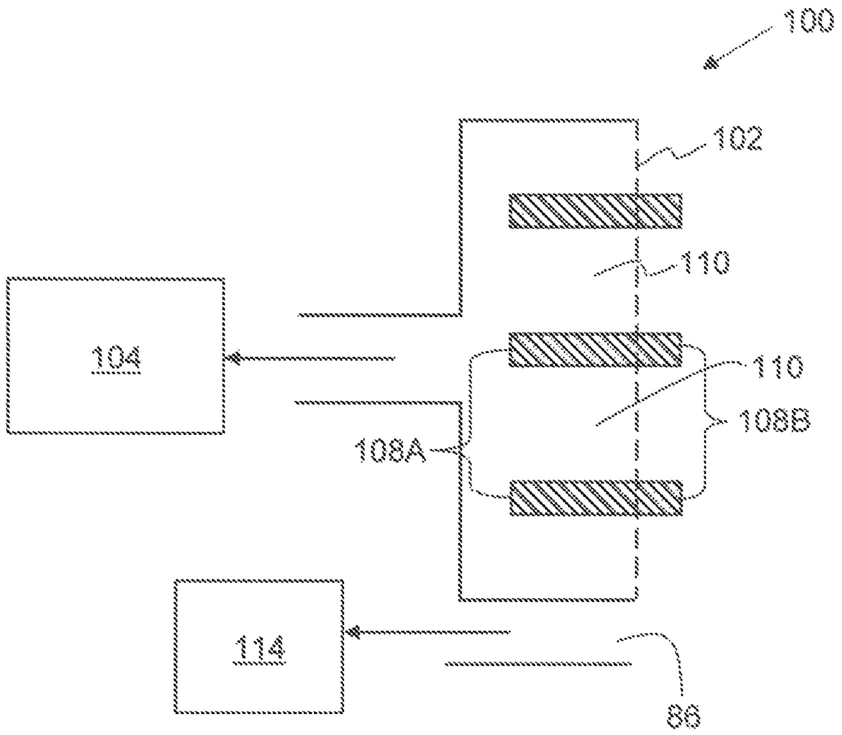
FIG. 7 is a schematic side view of an example embodiment of a liquid drop contact structure according to the present invention including two reinforcing structures.

In some embodiments, such as the one shown in FIG. 6, the reinforcing structure 108 is located on an external side (outside) of the liquid drop contact structure 100. Additionally, in other embodiments, such as the one in FIG. 7, two reinforcing structures 108A and 108B can be included. When two reinforcing structures are included, one reinforcing structure 108B can be located on the outside of the liquid drop contact structure 100 and one reinforcing structure 108A can be located on the inside of the liquid drop contact structure 100. To minimize mist that might be created as the non-print drops strike the front face of the catcher, it is preferable to align the reinforcing structures 108 on the outside of the liquid drop contact structure 100 with the trajectory of the drops. However, other geometries can also be employed.

In some embodiments, the liquid drop contact structure can be brought into fluid communication with a fluid source. The fluid source can include an ink reservoir, a cleaning fluid reservoir, or another fluid source depending on the specific application contemplated. When the liquid drop contact structure is in fluid communication with a fluid source, the fluid can be introduced into the liquid drop contact structure to maintain the wetness of pores or to replenish the pores with fresh fluid. For example, during a start-up sequence, cleaning fluid can be introduced to the liquid drop contact structure and pores so as to dissolve any dried ink and wash away any debris while wetting the pores to enhance the absorption of drops contacting the liquid drop contact structure by the pores.

Advantageously, the catcher of the present invention maximizes liquid removal rates with a reduced drop contact surface area while maintaining structural robustness. Additionally, the catcher of the present invention reduces liquid build up on the drop contact surface of the catcher and reduces the likelihood of air being ingested into the catcher.

The porous catcher is manufactured via a multi-step etching method using photolithographic masks. Generally, a catcher face material layer is provided on a reinforcing structure material layer. As discussed above, materials suitable for the catcher face material layer include, but are not limited to, dielectric materials such as silicon oxide, silicon nitride, or silicon carbide, metals such as tantalum, polymeric materials, or silicon. The reinforcing structure material layer is a thin flexible material layer, which provides the enhanced mechanical strength without adding too much flow resistance. Examples of flexible materials are metals such as tantalum, polymers such as polyimide or SU-8, and dielectric materials. The specific materials for each layer depend on the specific application contemplated. The step of providing a catcher face material layer on a reinforcing structure material layer can be achieved by lamination of the two layers or by a deposition process, depending on the specific application contemplated and the particular materials chosen. A first etching process is used to form the pores in the catcher face material layer, and a second etching process is used to form the openings in the reinforcing structure material layer. These steps can be accomplished in various orders, as will be described below. The specific etching processes chosen depend on the materials selected for the catcher face material layer and the reinforcing structure material layer. The pores 102 of the catcher face 90 and the openings in the reinforcing structure material layer are fluidically connected by way of a material removal process, and the reinforcing structure is in mechanical contact with the catcher face 90. Thus, the reinforcing structure can be in direct contact with the catcher face as shown in FIGS. 4-7, or the reinforcing structure can be in contact with other layers which allow it to be mechanically coupled to the catcher face 90, as shown in FIG. 12.

Figure 8A:
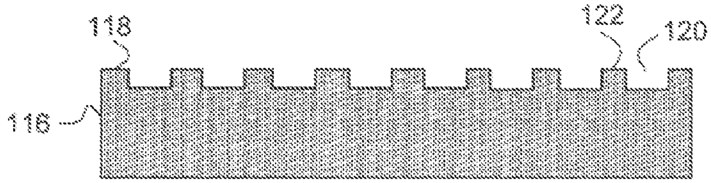
FIGS. 8(A)-8(F) are schematic views of an example embodiment of a method for manufacturing a liquid drop contact structure according to the present invention.
Figure 8B:
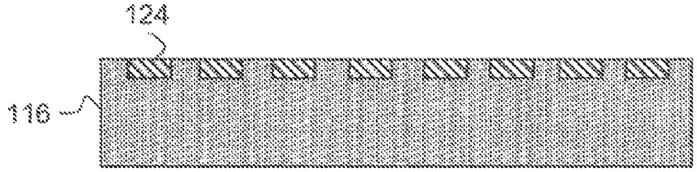
Figure 8C:
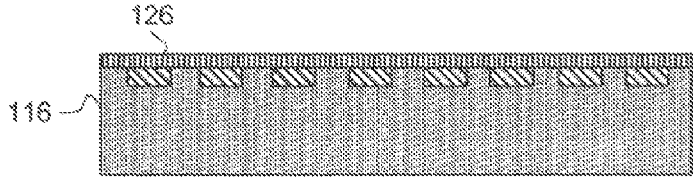
Figure 8D:
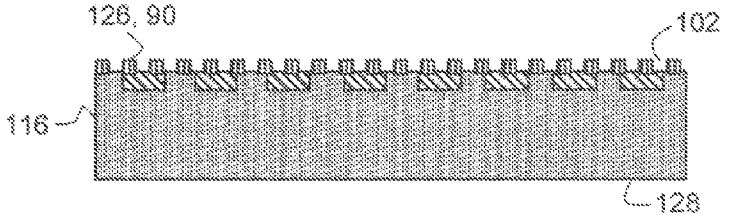
Figure 8E:
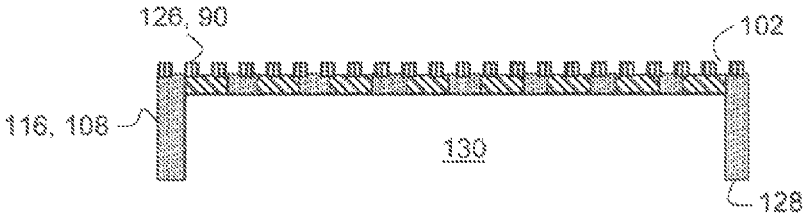
Figure 8F:
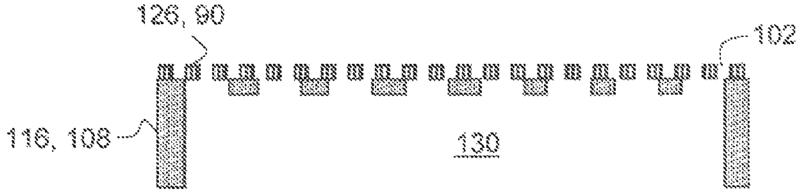

One example embodiment of a manufacturing method is shown in FIGS. 8(A)-(F). In FIG. 8(A), the reinforcing structure material layer 116 is masked and etched on a first side 118 to create openings 120 in the reinforcing structure material layer 116. These openings 120 correspond to the fluid return channels 110. The material that is not etched away 122 corresponds to the reinforcing structure 108 in FIG. 4. The openings 120 on the first side 118 of the reinforcing structure material layer 116 can then be filled with a sacrificial material layer 124. The sacrificial material layer can be a polymer such as a polyimide or consist of other materials. Subsequently, a planarization process such as a chemical mechanical polish (or CMP) is used to remove excess thickness of the sacrificial material layer 124 to bring it down to the same level as the first side 118 of the reinforcing structure material layer 116, as shown in FIG. 8(B). When the openings have been filled, the catcher face material layer 126 is provided via a deposition or a lamination process, as shown in FIG. 8(C). Other processes can be used, provided that they sufficiently join the layers together, depending on the specific application contemplated. As shown in FIG. 8(D), the catcher face material layer 126 is masked using a photolithographic mask and the layer is etched, creating the pores 102 in the catcher face. The second side 128 of the reinforcing structure material layer 116 is then masked using a photolithographic mask and etched to create the liquid removal manifold 130, as shown in FIG. 8(E). In FIG. 8(F), a material removal process is used to release the sacrificial material layer 124 and to fluidically connect the openings 120 in the reinforcing structure (now fluid channels 110) and the pores 102 of the catcher face. When a polymer such as a polyimide is used as the sacrificial material layer, oxygen plasma can be used to remove the layer. When other materials are used as the sacrificial material layer, other processes for removal will be apparent to those skilled in the art.

Figure 9A:
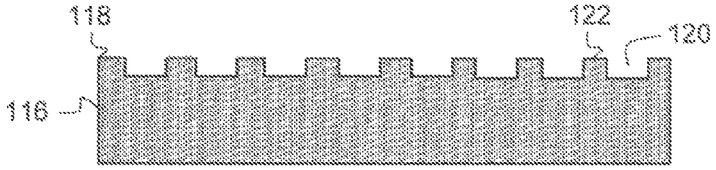
FIGS. 9(A)-9(F) are schematic views of another example embodiment of a method for manufacturing a liquid drop contact structure according to the present invention.
Figure 9B:
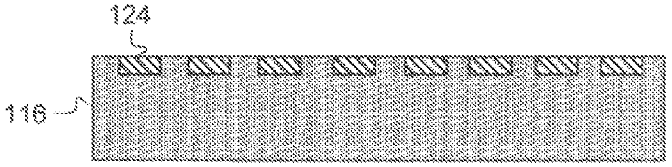
Figure 9C:
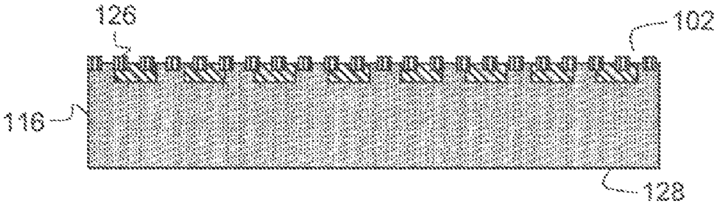
Figure 9D:
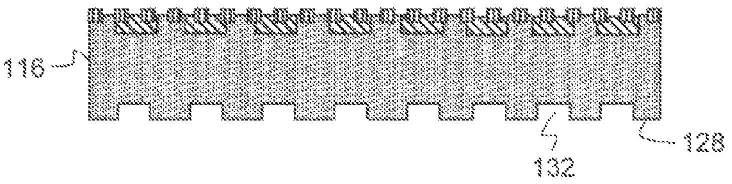
Figure 9E:
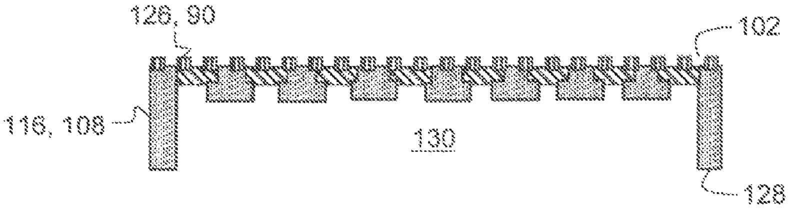
Figure 9F:
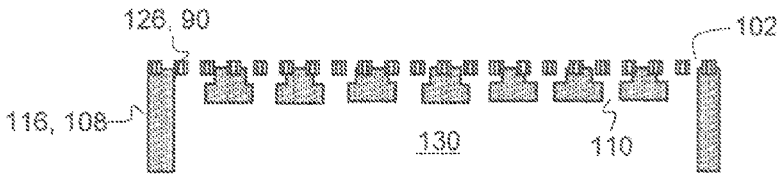

Referring now to FIGS. 9(A)-(F), another example embodiment of the method is shown. As above, in FIG. 9(A), the reinforcing structure material layer 116 is masked and etched on a first side 118 to create openings 120 in the reinforcing structure material layer 116. Again, these openings 120 correspond to the fluid return channels 110. The material that is not etched away 122 corresponds to a portion the reinforcing structure 108 in FIG. 5. The openings 120 on the first side 118 of the reinforcing structure material layer 116 can then be filled with a sacrificial material layer 124. Subsequently, a planarization process such as a chemical mechanical polish (or CMP) is used to remove excess thickness of the sacrificial material layer 124 to bring it down to the same level as the first side 118 of the reinforcing structure material layer 116, as shown in FIG. 9(B). When the openings 120 have been filled, the catcher face material layer 126 is provided via a deposition or a lamination process (not shown). The catcher face material layer 126 is masked using a photolithographic mask and the layer is etched, as shown in FIG. 9(C), creating the pores 102 in the catcher face. In FIG. 9(D), the second side 128 of the reinforcing structure material layer 116 is masked using a third photolithographic mask and etched to create openings 132 in the backside (or second side) 128 of the reinforcing structure material layer 116. These openings 132 are of a different cross-section than the openings 120 etched in the first side 118 of the reinforcing structure material layer 116. In FIG. 9(E), a fourth photolithographic mask is used to again mask the second side 128 of the reinforcing structure material layer 116 and it is again etched to form the liquid removal manifold 130. A material removal process is used to release the sacrificial material layer 124, fluidically connecting the openings 132 and 120 (now fluid channels 110) in the reinforcing structure and the pores 102 of the catcher face (shown in FIG. 9(F)). As above, the specific material removal process to be used depends on the particular material selected for the sacrificial material layer.

Figures 10A, 10B, 10C, 10D:
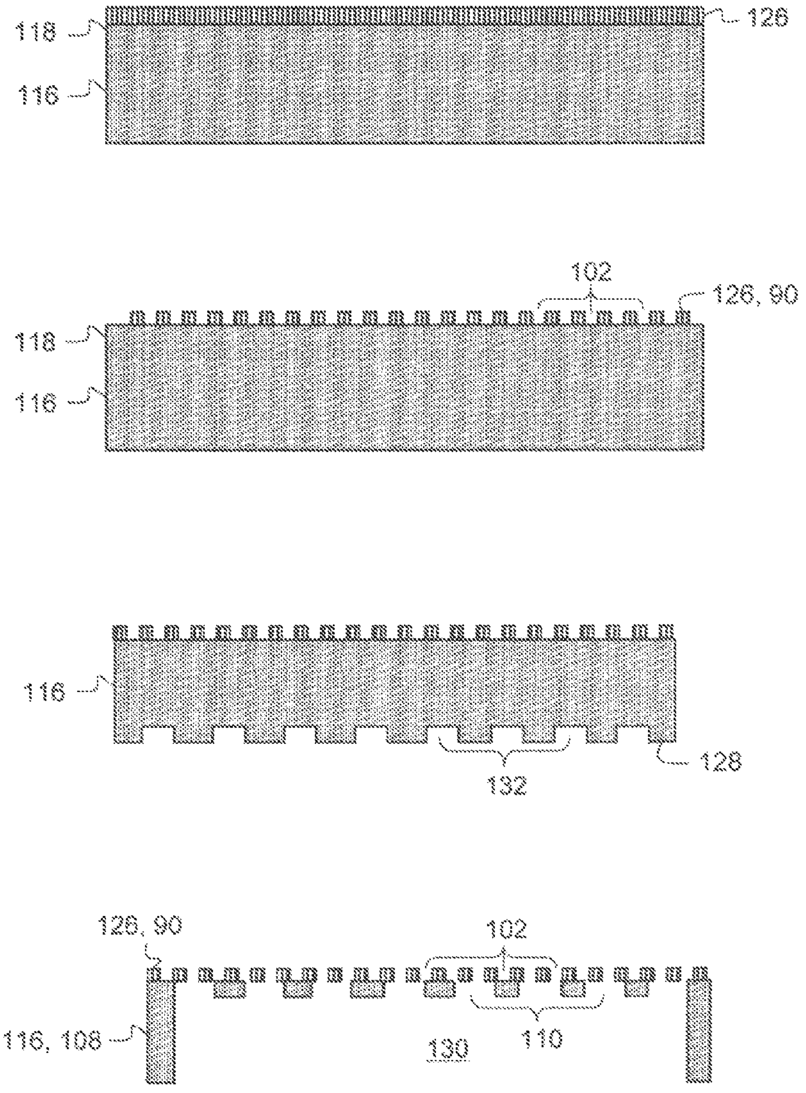
FIGS. 10(A)-10(D) are schematic views of another example embodiment of a method for manufacturing a liquid drop contact structure according to the present invention.

It is not necessary to etch the openings in the reinforcing structure material layer before applying the catcher face material layer, as is shown in the example embodiment described with reference to FIGS. 10(A)-(D). In FIG. 10(A), the catcher face material layer 126 is provided on the first side 118 of the reinforcing structure material layer 116 via a deposition or a lamination process. As previously stated, other processes can be used, provided that they sufficiently join the layers together, depending on the specific application contemplated. The catcher face material layer 126 is masked using a first photolithographic mask and the layer is etched, creating the pores 102 in the catcher face, as shown in FIG. 10(B). Next, in FIG. 10(C) the second side 128 of the reinforcing structure material layer 116 is masked using a second photolithographic mask and etched to create openings 132 in the backside (or second side) 128 of the reinforcing structure material layer 116. These openings 132 define the locations of the fluid channels 110 of the reinforcing structure. Then, in FIG. 10(D), an additional photolithographic mask is used to mask the second side 128 of the reinforcing structure material layer 116 and the second side 128 of the reinforcing structure material layer 116 is again etched to form the liquid return manifold 130. This final etching process additionally fluidically connects the openings in the reinforcing structure (now the fluid channels 110) and the pores 102 of the catcher face.

Figure 11A:
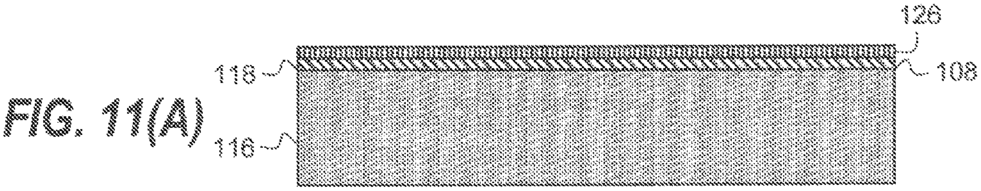
FIGS. 11(A)-11(E) are schematic views of an example embodiment of a method for manufacturing a liquid drop contact structure according to the present invention where the catcher face material layer is etched and forms a mask for use in etching the reinforcing structure material layer.
Figure 11B:
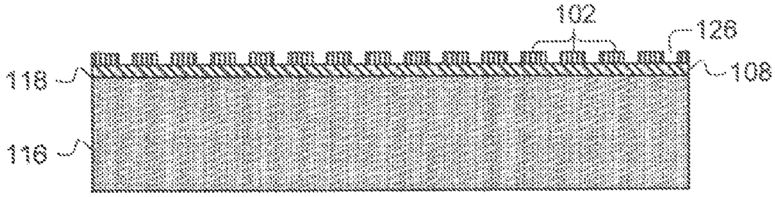
Figure 11C:
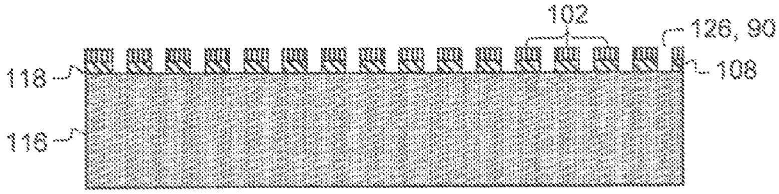
Figure 11D:
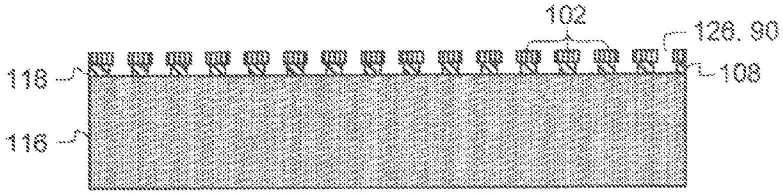
Figure 11E:
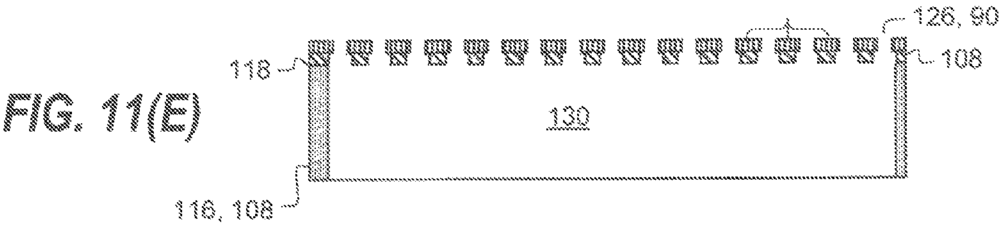

Furthermore, in some embodiments of the method, such as the example embodiment shown in FIGS. 11(A)-11(E), the catcher face material layer can be etched first, forming a mask for use in etching the reinforcing structure material layer. When this method is used, the catcher face material layer 126 applied to the reinforcing structure material layer 108 by deposition or lamination as shown in FIG. 11(A). The reinforcing structure material layer is a thin flexible material layer, which provides the enhanced mechanical strength without adding too much flow resistance. Examples of flexible materials are metals such as tantalum or polymers such as polyimide or SU-8. In FIG. 11(B), a first photolithographic mask is applied and the catcher face material layer 126 is etched, creating the pores 102 in the catcher face. Upon completion of the first etching process, the etched catcher face material layer forms the mask for use during a second etching process to etch the fluid channels through the reinforcing structure material layer 108 using an anisotropic etching process, FIG. 11(C), or an isotropic etching process (not shown). When an anisotropic etching process is used, the fluid channels have uniform cross section that is substantially the same as the pores in the catcher face layer. When an isotropic etch process is used, the difference in material properties of the layers will result in the openings in the reinforcing structure material layer (the fluid channels) being larger than the openings in the catcher face material layer (the pores). Due to the nature of isotropic etching, the cross section of the fluid channel varies through the thickness of the reinforcing structure material layer. Also, fluid channel cross section that is smaller than the thickness of the reinforcing structure material layer can not be created using the single isotropic etching process. Alternatively, a two step etching process can be used to etch the reinforcing structure material layer 108 by an anisotropic etching process followed by an isotropic etching process. In FIG. 11(D), an anisotropic etching process is used to etch through the reinforcing structure material layer 108. Then in FIG. 11(E), an isotropic etching process is used to increase the cross section of the fluid channel etched through the reinforcing structure material layer 108. The cross section of the fluid channel through the thickness of the reinforcing structure material layer is more uniform in the two step etching process than in the single isotropic etching process. Furthermore, a high aspect ratio fluid channel (cross section width smaller than the thickness of the reinforcing structure material layer) can be created using the two step etching process.

In some embodiments of the method, an etch stop is used for higher accuracy of the etching process. The etch stop is a material that is not etched by the etching process used to etch another material layer. For example when etching Silicon using the DRIE process, silicon dioxide or silicon nitride can be used as etch stops. Such etch stop materials can then be removed by using an etching process that doesn't attack the silicon. When an etch stop is used, the depth of etching will be controlled by the location or depth of the etch stop rather than by time alone.

Figure 12A:
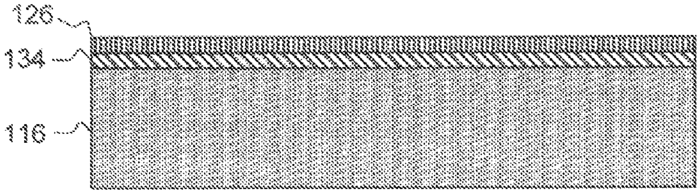
FIGS. 12(A)-12(D) are schematic views of an example embodiment of a method for manufacturing a liquid drop contact structure according to the present invention including the use of an etch stop between the catcher face material layer and the reinforcing structure material layer.
Figure 12B:
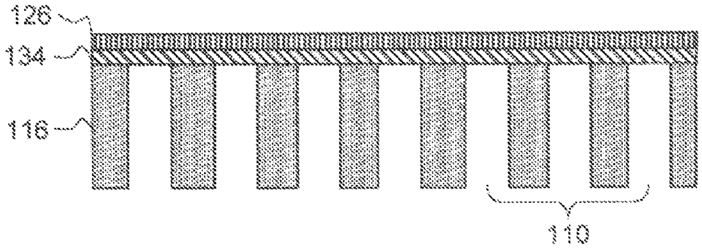
Figure 12C:
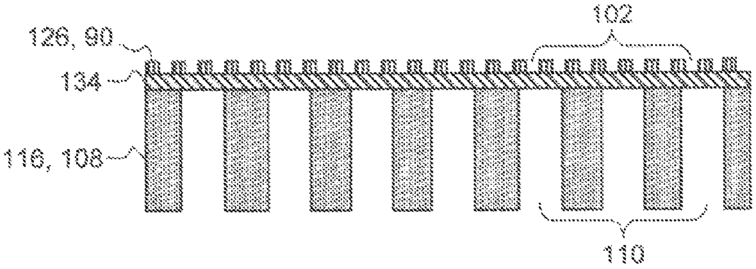
Figure 12D:
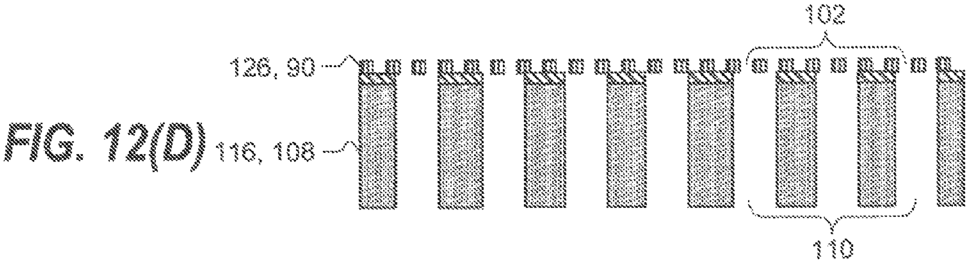

In the example embodiment shown in FIGS. 12(A)-12(D), the reinforcing structure material layer 116 is in direct contact with the first surface of an etch stop layer 134. The second surface of the etch stop layer 134 is in direct contact with the catcher face material layer 126, as shown in FIG. 12(A). Thus, where without an etch stop the etching can vary because of the variable thickness of the layer being etched, the etch stop ensures that the layer is etched to a uniform depth. Referring to FIG. 12(B), the reinforcing structure material layer 116 is masked using a photolithographic mask and then etched to the etch stop 134. The openings etched in the reinforcing structure material layer 116 correspond to the fluid channels 110. Likewise, as shown in FIG. 12(C), the catcher face material layer 126 is masked using a photolithographic mask and then etched to the etch stop 134. The openings etched in the catcher face material layer 126 correspond to the pores 102 in the catcher face. Finally, as shown in FIG. 12(D), the photolithographic masks are removed from the surfaces of the catcher face material layer 126 and the reinforcing structure material layer 116, and the etch stop 134 is removed to fluidically connect the pores 102 of the catcher face and the openings of the reinforcing structure (fluid channels) 110. The specific process necessary for removal of the etch stop layer depends on the particular material selected as an etch stop, and will be apparent to one skilled in the art.

Figure 13A:
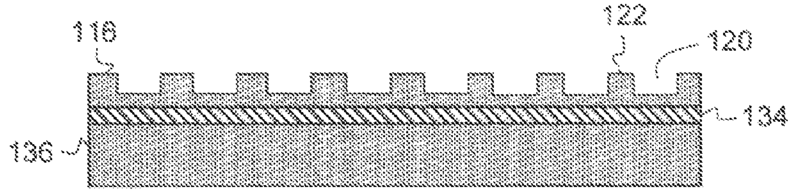
FIGS. 13(A)-13(F) are schematic views of an example embodiment of a method for manufacturing a liquid drop contact structure according to the present invention including the use of an etch stop between the reinforcing structure material layer and the substrate.
Figure 13B:
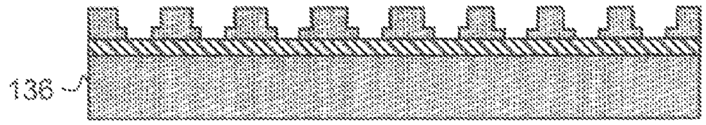
Figure 13C:
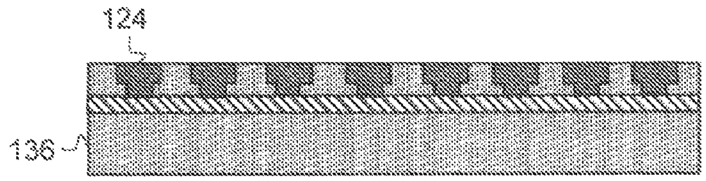
Figure 13D:
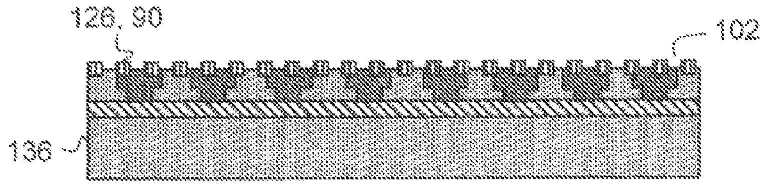
Figure 13E:
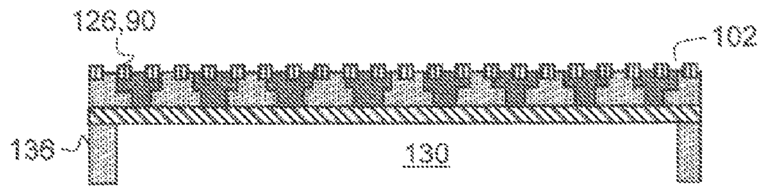
Figure 13F:
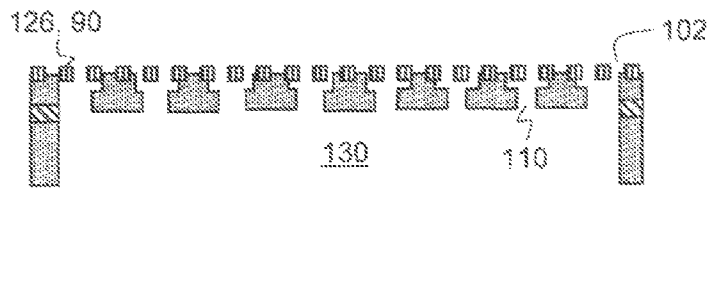

The location of an etch stop layer is not limited to between the catcher face material layer and the reinforcing structure material layer, however. For example, as shown in FIGS. 13(A)-(F), the etch stop layer 134 can be located between the reinforcing structure material layer 116 and a substrate 136. The substrate can be, for example, silicon, though other materials can be used depending on the specific application contemplated. When the etch stop layer 134 is located between the reinforcing structure material layer 116 and a substrate 136, the openings in the reinforcing structure (which become the fluid channels 110) are created by masking the reinforcing structure material layer 116 using a photolithographic mask and etching to the etch stop 134. This can be done in one step (not shown) or, as shown in the example embodiment shown in FIG. 13(A), a first photolithographic mask can be applied and the reinforcing structure material layer 116 can be etched for a specific period of time, but stopped before reaching the etch stop layer 134, creating openings 120 in the reinforcing structure material layer 116. Then, as shown in FIG. 13(B), another photolithographic mask is used, and the reinforcing structure material layer 116 is etched to the etch stop layer 134. This two-step etching process creates openings 120 (and later fluid channels 110) with varying cross-sections over the length of the opening 120 (or fluid channel 110). The openings 120 of the reinforcing structure material layer 116 are then filled with a sacrificial material layer 124. Subsequently, a planarization process such as a chemical mechanical polish (or CMP) is used to remove excess thickness of the sacrificial material layer 124 to bring it down to the same level as the first side 118 of the reinforcing structure material layer 116, as shown in FIG. 13(C). When the openings 120 have been filled, the catcher face material layer 126 can then be provided via a deposition or a lamination process. Other processes can be used, provided that they sufficiently join the layers together, depending on the specific application contemplated. As described in accordance with other embodiments above, the catcher face material layer 126 is masked using a photolithographic mask and the layer is etched to create the pores 102 in the catcher face (shown in FIG. 13(D)). Additionally, the substrate 136 can be masked and etched to form, for example, a liquid removal manifold 130, as shown in FIG. 13(E). The etch stop layer 134 and the sacrificial material layer 124 are then removed, fluidically connecting the pores 102 of the catcher face, the fluid channels 110, and the liquid removal manifold 130. However, the liquid return manifold 130 need not be etched while it is attached to the reinforcing structure. For example, the liquid return manifold can be attached to a reinforcing structure/catcher face assembly after each has been already formed.

Figure 14A:
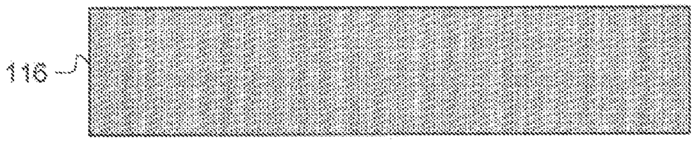
FIGS. 14(A)-14(D) are schematic views of another example embodiment of a method for manufacturing a liquid drop contact structure according to the present invention.
Figure 14B:
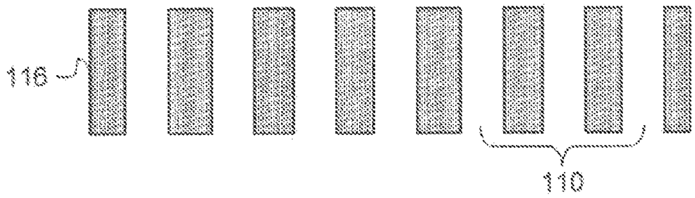
Figure 14C:
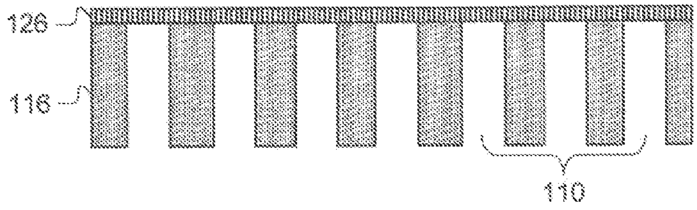
Figure 14D:
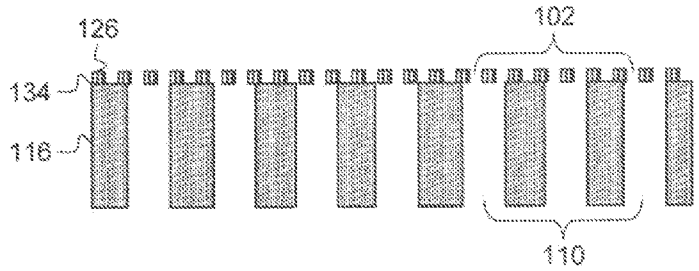

In the example embodiment shown in FIGS. 14(A)-14(D), the reinforcing structure material layer 116 is in direct contact with the catcher face material layer 126. A reinforcing structure material layer 116 is provided, as shown in FIG. 14(A). An example of the reinforcing structure material layer 116 is silicon. In FIG. 14(B), reinforcing structure material layer 116 is masked using a photolithographic mask and then etched through. For a silicon reinforcing structure material layer 116, a DRIE etching process can be used to produce the high aspect ratio through the wafer openings. The openings etched in the reinforcing structure material layer 116 correspond to the fluid channels 110. Referring to FIG. 14(C), a thin dry film material such as polyimide or a dry photo imageable polymeric material is laminated or bonded to the reinforcing structure material layer 116. Finally, as shown in FIG. 14(D), the photolithographic mask is applied to etch the pores 102 of the catcher face in the catcher face material layer 126. The final etch fluidically connects the pores 102 of the catcher face and the openings of the reinforcing structure (fluid channels) 110.

Figure 15E:
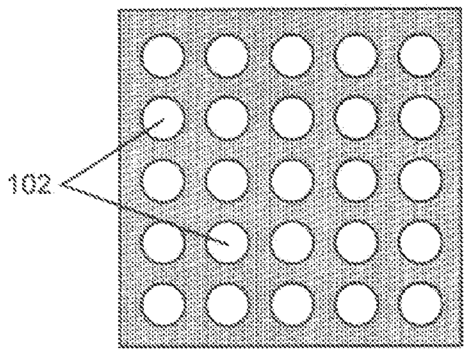
Figure 15F:
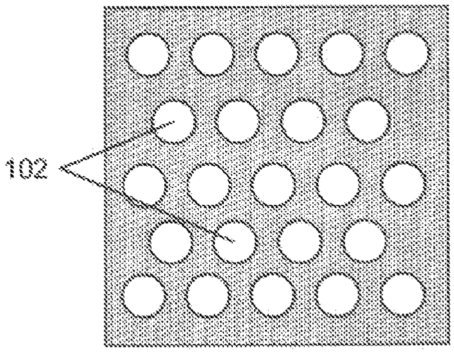

FIGS. 15(A)-15(E) shown example arrangements of the pores of the liquid drop contact structure. In FIG. 15(A), the pores are long slots extend substantially parallel to the direction of the liquid drops. In FIG. 15(B), the pores are long slots extend substantially perpendicular to the direction of the liquid drops. In FIG. 15(C), the pores have square or rectangular shapes. In FIG. 15(D), the pores are oval shaped. In FIG. 15(E), the pores are circles arranged in a square pattern. In FIG. 15(F), the pores are circles arranged in a hexagonal pattern. Other pore shapes or patterns are possible.

The following example, corresponding to the manufacturing steps shown in FIGS. 12(A) through 12(D), provides an example embodiment of the manufacturing method of the present invention and is not inclusive of all possible embodiments of the invention.

A silicon-on-insulator ("SOI") wafer was selected having the following configuration: a silicon layer with a thickness of 25 μm ("catcher face material layer"), a silicon dioxide layer with a thickness of 1 μm ("etch stop material layer"), and a second silicon layer with a thickness of 350 μm ("reinforcing structure material layer"). The SOI wafer was oxidized to create a 2 μm layer of silicon dioxide on each of the catcher face material layer and the reinforcing structure material layer.

The wafer was patterned through photolithography to define an etching pattern for the reinforcing structure material layer. RIE was used to etch the silicon dioxide on the reinforcing structure material layer to form the etching mask for the reinforcing structure material layer. DRIE was then used to etch the reinforcing structure material layer. The etching was stopped when it reached the etch stop material layer. This step creates the fluid channels in the reinforcing structure material layer.

The wafer was also patterned through photolithography to define an etching pattern for the catcher face material layer. Reactive ion etching ("RIE") was used to etch the silicon dioxide on the catcher face material layer to form the etching mask for the catcher face material layer. Deep reactive ion etching ("DRIE") was then used to etch the catcher face material layer. The etching was stopped when it reached the etch stop material layer. This step creates the pores having a pore size of about 3 μm to about 5 μm in the catcher face material layer.

RIE was used to etch away the exposed silicon dioxide. The RIE is a material removal process which removes the material in the etch stop material layer to mechanically couple the pores in the catcher face material layer to the fluid channels in the reinforcing structure material layer.

The invention has been described in detail with particular reference to certain preferred embodiments thereof, but it will be understood that variations and modifications can be effected within the scope of the invention.

PARTS LIST

20 continuous ink jet printer system
22 image source
24 image processing unit
26 mechanism control circuits
28 device
30 printhead
32 recording medium
34 recording medium transport system
36 recording medium transport control system
38 micro-controller
40 reservoir
42 catcher
44 recycling unit
46 pressure regulator
47 channel
48 jetting module
49 nozzle plate
50 plurality of nozzles
51 heater
52 liquid
54 drops
56 drops
57 trajectory
58 drop stream
60 gas flow deflection mechanism
61 positive pressure gas flow structure
62 gas
63 negative pressure gas flow structure
64 deflection zone
66 small drop trajectory
68 large drop trajectory
72 first gas flow duct
74 lower wall
76 upper wall
78 second gas flow duct
82 upper wall
84 seal
86 liquid return duct
88 plate
90 front face
92 positive pressure source
94 negative pressure source
96 wall
100 liquid drop contact structure
102 pores
104 negative pressure source
106 pressure regulator
108 reinforcing structure
110 fluid channels
111 Non-porous Section
112 Edge with radius
114 additional vacuum source
116 reinforcing structure material layer
118 first side of reinforcing structure material layer
120 openings in first side of reinforcing structure material layer
122 material left by etch
124 sacrificial material layer
126 catcher face material layer
128 second side of reinforcing structure material layer
130 liquid removal manifold
132 openings in second side of reinforcing structure material layer
134 etch stop layer
136 substrate

The invention claimed is:

1. A method of manufacturing a catcher including a liquid drop contact surface upon which non-print liquid drops impinge, the liquid drop contact surface including pores through which liquid from the impinging non-print liquid drops is drawn, the catcher including fluid return channels through which the liquid flows after being drawn through the pores of the liquid drop contact surface, the method comprising:

providing a catcher face material layer;

providing a reinforcing structure material layer that is in mechanical contact with the catcher face material layer;

forming the liquid drop contact surface by forming the pores in the catcher face material layer using a first etching process that is controlled by a first photolithographic mask;

forming the fluid return channels by forming openings in the reinforcing structure material layer using a second etching process that is controlled by a second photolithographic mask; and fluidically connecting the openings in the reinforcing structure and the pores of the catcher face using a material removal process so that liquid drawn through the pores of the catcher face material layer flows through the openings of the reinforcing structure.

2. The method of claim 1, wherein providing the reinforcing structure material layer that is in mechanical contact with the porous catcher face includes providing an etch stop material layer between the reinforcing structure material layer and the catcher face material layer.

3. The method of claim 2, wherein forming pores in the catcher face material layer using the first etching process that is controlled by the first photolithographic mask includes etching the catcher face material layer to the etch stop material layer.

4. The method of claim 2, wherein forming openings in the reinforcing structure material layer that are in fluid communication with the pores of the catcher face using the second etching process that is controlled by the second photolithographic mask includes etching the reinforcing structure material layer to the etch stop material layer.

5. The method of claim 2, wherein the material removal process that fluidically connects the openings in the reinforcing structure and the pores of the catcher face comprises removing the etch stop layer.

6. The method of claim 1, wherein the second photolithographic mask comprises the catcher face material layer after the pores have been formed therein.

7. The method of claim 1, wherein providing the catcher face material layer includes providing the catcher face material layer over the openings of the reinforcing structure material layer that have been filled with a sacrificial material.

8. The method of claim 7, wherein the material removal process that fluidically connects the openings in the reinforcing structure and the pores of the catcher face comprises removing the sacrificial material that filled the openings of the reinforcing structure.

9. The method of claim 7, wherein providing the catcher face material layer includes depositing the catcher face material layer over the reinforcing structure after the openings have been filled.

10. The method of claim 1, wherein forming openings in the reinforcing structure material layer using the second etching process that is controlled by the second photolithographic mask further comprises:

using a third etching process that is controlled by a third photolithographic mask such that the size of the opening formed using the third etching process is different when compared to the size of the opening formed using the second etching process.

11. The method of claim 1, further comprising:

providing a substrate;

providing an etch stop material layer between the substrate and the reinforcing structure material layer, wherein forming the openings in the reinforcing structure material layer using the second etching process that is controlled by the second photolithographic mask includes etching the reinforcing structure material layer to the etch stop material layer.

12. The method of claim 11, wherein providing the catcher face material layer includes providing the catcher face material layer over the openings of the reinforcing structure material layer that have been filled with a sacrificial material.

13. The method of claim 1, wherein providing the catcher face material layer comprises one of a deposition process and a lamination process.

14. The method of claim 1, wherein providing the catcher face material layer comprises laminating the catcher face material layer to the reinforcing structure material layer.

15. The method of claim 1, further comprising:

connecting the reinforcing structure and the catcher face to a liquid removal manifold.

16. The method of claim 1, further comprising:

providing a support structure material layer that is in mechanical contact with the porous catcher face; and forming a plurality of liquid removal channels in the support structure material layer using a fourth etching process that is controlled by a fourth photolithographic mask.

17. The method of claim 16, wherein the fourth etching process is the material removal process that fluidically connects the openings in the reinforcing structure and the pores of the catcher face.

18. A method of manufacturing a porous catcher comprising:

providing a catcher face material layer;

providing a reinforcing structure material layer that is in mechanical contact with the porous catcher face;

providing a substrate;

providing an etch stop material layer between the substrate and the reinforcing structure material layer;

forming pores in the catcher face material layer using a first etching process that is controlled by a first photolithographic mask;

forming openings in the reinforcing structure material layer using a second etching process that is controlled by a second photolithographic mask; and fluidically connecting the openings in the reinforcing structure and the pores of the catcher face using a material removal process, wherein forming the openings in the reinforcing structure material layer using the second etching process that is controlled by the second photolithographic mask includes etching the reinforcing structure material layer to the etch stop material layer, and wherein providing the catcher face material layer includes providing the catcher face material layer over the openings of the reinforcing structure material layer that have been filled with a sacrificial material.

19. The method of claim 18, wherein the material removal process that fluidically connects the openings in the reinforcing structure and the pores of the catcher face comprises removing the etch stop layer and removing the sacrificial material that filled the openings of the reinforcing structure.

20. The method of claim 18, wherein the pores have a substantially uniform size.

* * * * *